United States Patent [19]

Ohtsuka et al.

[11] Patent Number: 5,296,325
[45] Date of Patent: Mar. 22, 1994

[54] DICYANOIMIDAZOLE COMPOUNDS USABLE AS COLORANTS FOR MAGENTA TONERS, COLORED RESINS, COLORED MOLDED RESIN MEMERS AND COLOR FILTERS

[75] Inventors: Masahiro Ohtsuka, Osaka; Tohru Tamura, Kodoma, both of Japan

[73] Assignee: Orient Chemical Industries, Ltd., Osaka, Japan

[21] Appl. No.: 967,178

[22] Filed: Oct. 27, 1992

Related U.S. Application Data

[62] Division of Ser. No. 649,759, Feb. 1, 1991, Pat. No. 5,233,028.

Foreign Application Priority Data

Feb. 3, 1990 [JP] Japan .................................. 2-24850

[51] Int. Cl.$^5$ .............................................. G03G 9/00
[52] U.S. Cl. ................................ 430/106; 430/109
[58] Field of Search ............................ 430/106, 109

[56] References Cited

U.S. PATENT DOCUMENTS

4,600,681  7/1986  Bergthaller et al. ................ 430/242

Primary Examiner—Marion E. McCamish
Assistant Examiner—S. Rosasco
Attorney, Agent, or Firm—McGlew and Tuttle

[57] ABSTRACT

(1) Dicyanoimidazole compound derivative represented by the formula [I]

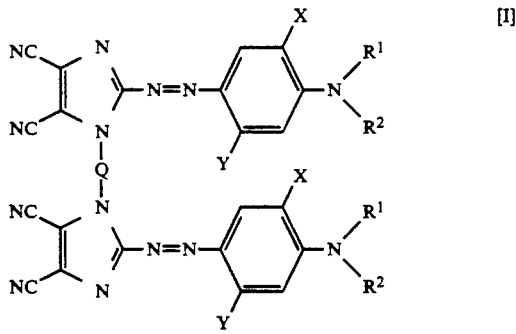

$R^1$, $R^2$: alkyl group, alkoxyalkyl group, hydroxyalkyl group, β-cyanoethyl group, β-chloroethyl group, aralkyl group, aryl group; X: hydrogen atom, lower alkoxy group, methyl group, halogen atom; Y: hydrogen atom, methyl group, methoxy group, formylamino group, alkylcarbonylamino group, alkylsulfonylamino group, alkoxycarbonylamino group; —Q—: —(CR$_2$)$_n$— [n: integer of 1 to 12, R: hydrogen atom, alkyl group],

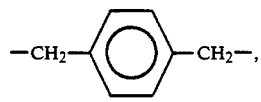

—CH=CH—, —CH$_2$CH=CHCH$_2$—, —CH$_2$—CH=CH—].

(2) Magenta toner for color electrophotography containing at least one kind of the dicyanoimidazole compound derivative represented by the formula [I] as a coloring agent.

(3) Colored resin and resin color filter containing at least one kind of the dicyanoimidazole compound derivative represented by the formula [I] in solution.

(4) Colored molded resin member and resin color filter dyed with at least one kind of the dicyanoimidazole compound.

17 Claims, 1 Drawing Sheet

DICYANOIMIDAZOLE COMPOUNDS USABLE AS COLORANTS FOR MAGENTA TONERS, COLORED RESINS, COLORED MOLDED RESIN MEMERS AND COLOR FILTERS

This is a division of application Ser. No. 07/649,759 filed Feb. 1, 1991 now U.S. Pat. No. 5,233,028.

BACKGROUND OF THE INVENTION

1. Field of the Invention

The present invention relates to a dicyanoimidazole compound derivative and a magenta toner for color electrophotography, colored resin, colored molded resin member and a resin color filter incorporating the dicyanoimidazole compound derivative.

2. Description of the Prior Art

To impart a color to toners for color electrophotography, thermoplastic resins, thermosetting resins, color filters, etc., various pigments and dyes are used according to respective uses and purposes.

For example, organic pigments are commonly utilized since they are excellent in color fastness to light and heat resistance and offers a wide variety of colors, particularly distinct colors.

Also, oil-soluble dyes and dispersion dyes are used to obtain toners with distinct color for color electrophotography and colored resins with transparency and gloss since they are highly soluble in resin.

Moreover, a toner for color electrophotography incorporating a sublimational dye makes it possible to obtain images which are high in both chromaticity and lightness.

In color electrophotography, to obtain full-color images by superposing toner images of yellow, magenta and cyan colors, the three subtractive primaries, it is necessary for each toner to have a good spectral property and transparency for color reproduction. Transparency is also required in toners used for color electrophotography on sheets for overhead projector (hereinafter referred to as OHP). It should also be noted that these toners are required not to be prone to discoloration, fading or bleeding due to light or heat.

A number of means have been proposed to meet such requirements. For example, Japanese Patent Publication Open to Public Inspection Nos. 295069/1987, 155555/1987 and 217465/1989 respectively disclose a color toner incorporating various oil-soluble or dispersion dyes, a magenta toner incorporating a Rhodamine dye, and a magenta toner incorporating an anthraquinone dispersion dye. Also, color toners with improved light transmittance are proposed in Japanese Patent Publication Open to Public Inspection Nos. 52560/1987 and 75645/1987.

With respect to colored resins or colored molded resin members, transparency is often demanded as well as color fastness to light, bleeding resistance and resistance against heat during molding.

Optical color filters needed for television cameras, liquid crystal televisions, flat panel displays on computers, etc., must be good in spectral property and transparency.

Examples of red pigments for optical filters include those disclosed in Japanese Patent Publication Open to Public Inspection No. 278569/1989.

Although color filters are often produced by dyeing a dyable film of gelatin, casein, polyvinyl alcohol, or the like on a transparent resin or glass base plate with a pigment having a given spectral property by printing, sublimational transfer, etc., it is desirable to color the resin itself from the viewpoint of durability.

Of such conventional coloring agents, organic pigments often fail to satisfy the requirement for transparency because they are almost insoluble in resin. On the other hand, oil-soluble dyes and dispersion dyes are prone to discoloration, fading, and bleeding. As for sublimation dyes, they often show re-sublimation over a long period, which in turn may cause image density reduction or staining; therefore, their application is limited to auxiliary use for the above-mentioned purposes.

Therefore, none of the toners for color electrophotography, colored resins, colored molded resin members and color filters which incorporate a conventional coloring agent are said to fully satisfy the essential requirements described above.

SUMMARY OF THE INVENTION

It is an object of the present invention to provide a dicyanoimidazole compound derivative which is good in color fastness to light, heat resistance, spectral property, resin solubility and bleeding resistance.

It is another object of the present invention to provide a magenta toner for color electrophotography which offers a good spectral property and transparency and which permits good color reproduction for full-color electrophotography.

It is yet another object of the present invention to provide a colored resin or colored molded resin member which is good in color fastness to light, bleeding resistance, heat resistance and transparency.

It is still another object of the present invention to provide a resin color filter which is good in transparency, spectral property and durability.

A dicyanoimidazole compound derivative of the present invention is represented by the formula [I] given below.

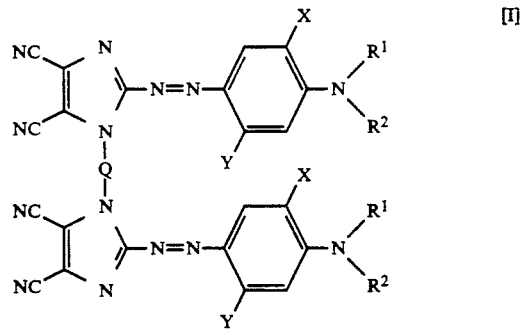

wherein $R^1$ and $R^2$ independently represent alkyl group ($C_1$-$C_{12}$), alkoxyalkyl group ($C_3$-$C_{12}$), hydroxyalkyl group, β-cyanoethyl group, β-chloroethyl group, aralkyl group or aryl group; X represents a hydrogen atom, lower alkoxy group, methyl group or halogen atom; Y represents hydrogen atom, methyl group, methoxy group, formylamino group, alkyl ($C_1$-$C_8$) carbonylamino group, alkyl ($C_1$-$C_8$) sulfonylamino group or alkoxy ($C_1$-$C_8$) carbonylamino group; —Q— represents —$(CR_2)_n$— wherein n represents an integer of 1 to 12 and R independently represents hydrogen atom or alkyl group which may be branched,

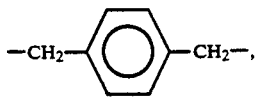

—CH=CH—,
—CH$_2$CH=CHCH$_2$— or
—CH$_2$—CH=CH—.

The magenta toner for color electrophotography of the present invention incorporates at least one kind of the dicyanoimidazole compound derivative represented by the formula [I] above as coloring agent.

It is preferable that the magenta toner for color electrophotography of the present invention comprise at least a binder resin, a coloring agent and a charge control agent, and that the coloring agent be at least one kind of the dicyanoimidazole compound derivative represented by the formula [I] above and the binder resin and charge control agent described above be substantially colorless.

The colored resin of the present invention incorporates at least one kind of the dicyanoimidazole compound derivative represented by the formula [I] above in solution.

The colored molded resin member of the present invention is dyed with at least one kind of the dicyanoimidazole compound derivative represented by the formula [I] above.

The resin color filter of the present invention incorporates at least one kind of the dicyanoimidazole compound derivative represented by the formula [I] above in solution.

Another mode of the resin color filter of the present invention is dyed with at least one kind of the dicyanoimidazole compound derivative represented by the formula [I] above in solution.

DETAILED DESCRIPTION OF THE INVENTION

Figure 1:
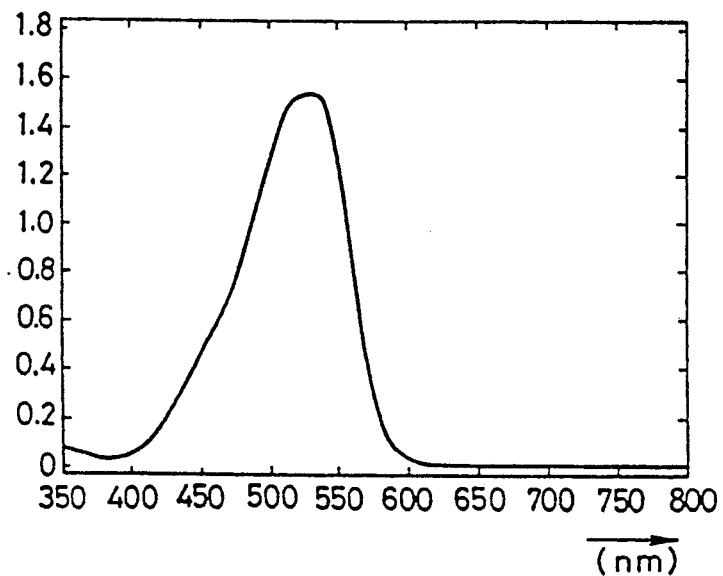
FIG. 1 is a visible-band absorption spectrum of the dicyanoimidazole compound derivative obtained in Preparation Example 1 (Example Compound 1).

In the formula [I] above, which represents the dicyanoimidazole compound derivative of the present invention, the alkyl groups (C$_1$-C$_{12}$), alkoxyalkyl groups (C$_3$-C$_{12}$) and hydroxyalkyl groups represented by R$^1$ and R$^2$, the lower alkoxy group represented by X, the alkyl (C$_1$-C$_8$) carbonylamino group, alkyl (C$_1$-C$_8$) sulfonylamino group and alkoxy (C$_1$-C$_8$) carbonylamino group represented by Y may be branched. Examples of such groups include methyl, ethyl, butyl, isoamyl, octyl, 2-ethylhexyl, nonyl, dodecyl, methoxyethyl, ethoxyethyl, hexyloxyethyl, β-hydroxyethyl, 3-hydroxybutyl, methoxy, ethoxy, isopropoxy, sec-butoxy, ethylcarbonylamino, methylsulfonylamino and ethoxycarbonylamino.

In the formula [I], the aralkyl group and aryl group represented by R$^1$ and R$^2$ may be substituted with a phenyl group, halogen atom, lower alkyl group, lower alkoxy group or another substituent. Examples of such aralkyl or aryl groups include benzyl, phenylethyl, methylbenzyl, 2-(4-fluorophenyl)ethyl, 2-(4-methylphenyl)ethyl, naphthylmethyl, phenyl, methoxyphenyl, tolyl, xylyl, biphenylyl and naphthyl.

An example of the production method for a compound represented by the formula [I] of the present invention is given below.

First, 2-amino-4,5-dicyanoimidazole, represented by the formula (a)

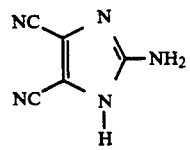

(a)

is diazotized by a standard method, followed by coupling with an aniline represented by the formula (b)

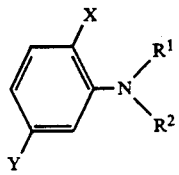

(b)

wherein X, Y, R$^1$ and R$^2$ have the same definitions as above, to yield a known dicyanoimidazole compound represented by the formula (c)

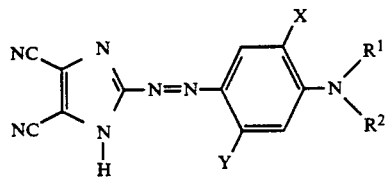

(c)

wherein X, Y, R$^1$ and R$^2$ have the same definitions as above.

Next, the compound of the formula (c) is reacted with any one of the compounds represented by the formulas (d) through (h) given below in the presence of potassium carbonate or another neutralizing agent in an organic solvent (e.g., dimethylformamide, acetone, methyl ethyl ketone) to yield the desired product.

The compound which forms the linkage chain (—Q—) is exemplified by the compounds represented by the following formulas (d) through (h).

Z—(CR$_2$)$_n$—Z    (d)

wherein Z represents a halogen atom; n represents an integer of 1 to 12, preferably 2 to 6; R independently represents hydrogen atom or alkyl group which may be branched.

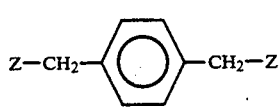

(e)

wherein Z has the same definition as above.

Z—CH=CH—Z    (f)

wherein Z has the same definition as above.

$$Z-CH_2CH=CHCH_2-Z \quad (g)$$

wherein Z has the same definition as above.

$$Z-CH_2-CH=CH-Z \quad (h)$$

wherein Z has the same definition as above.

The magenta toner for color electrophotography of the present invention contains as a coloring agent at least one kind of the dicyanoimidazole compound derivative represented by the formula [I] above, and it is preferable that it incorporate at least a substantially colorless binder resin and charge control agent.

The color toner of the present invention can incorporate almost any one of the conventional known binder resins for toner. To enhance the effect of the binder resin, there are demands for those properties such as transparency, substantial freedom of color (i.e., absence of color or presence of a color such that toner images do not undergo tone deterioration), capability of dissolving the dicyanoimidazole compound derivative of the present invention, positive or negative chargeability as such or by the addition of a charge control agent, fluidity under appropriate heating or pressurizing conditions, and pulverizability.

Examples of resins which can serve well as described above include polystyrene resin, acryl and acrylic resins, styrene (meth)acrylate copolymer, and polyester resin. Other usable resins include epoxy resin, polyamide resin, polyvinylal resin, polyethylene resin, polypropylene resin and polyolefin. These resins may be used singly or in blend of several kinds.

The color toner of the present invention may contain a charge control agent for the purpose of improving its triboelectrical chargeability. The charge control agent is preferably substantially colorless. Here, "substantially colorless" means the absence of color or a color such that toner images do not undergo tone deterioration.

Examples of preferably usable charge control agents include those for imparting negative charge such as metal complexes of aromatic o-oxycarboxylic acid, e.g., chromium complex, zinc complex or aluminum complex of alkyl-substituted salicylic acid, or chromium complex, zinc complex or aluminum complex of oxynaphthoic acid, and metal complexes of aromatic dicarboxylic acid such as chromium complex or zinc complex thereof. Examples of those which impart positive charge include quaternary ammonium compounds and polyamine resin.

To prepare a coloring agent for toner of the present invention, it is preferable to add a dicyanoimidazole compound derivative represented by the formula [I] in a ratio of 0.5 to 10 parts by weight, more preferably 1 to 5 parts by weight, per 100 parts by weight of binder resin.

The toner of the present invention may incorporate one or more other coloring agents as long as they do not interfere with the purpose or effect thereof.

The charge control agent is preferably added in a ratio of 0.1 to 10 parts by weight, more preferably 0.5 to 5 parts by weight, per 100 parts by weight of toner resin.

To improve toner quality, it is preferable to internally or externally add one or more additives other than the charge control agent, such as a fluidity improving agent and image peeling preventing agent.

The magenta toner for color electrophotography of the present invention is, for example, produced as follows:

A toner of 5 to 20 μm in average particle size can be obtained by thoroughly mixing the dicyanoimidazole compound derivative of the present invention, a binder resin, a charge control agent and, if necessary, a magnetic material, a fluidizing agent and other additives using a ball mill or another mechanical mixer, subsequently kneading the mixture in a molten state using a hot kneader such as a heat roll, kneader or extruder, cooling and solidifying the mixture, followed by pulverization and classification.

Other usable methods include the method in which the starting material is dispersed in a binder resin solution and then spray drying the dispersion, and the polymerizing toner production method in which a given set of materials are mixed in a monomer for binder resin to yield an emulsified suspension and then polymerizing it to yield the desired toner.

When using the toner of the present invention as a two-component developer, the toner is used in mixture with carrier powder and developed by the two-component magnetic brush developing process, etc.

Any known carrier can be used. Examples of the carrier include iron powder, nickel powder, ferrite powder, and glass beads of 50 to 200 μm in particle size, and such materials as coated with acrylate copolymer, styrene-acrylate copolymer, styrene-methacrylate copolymer, silicon resin, polyamide resin, ethylene fluoride resin, or the like.

When using the toner of the present invention as a single-component developer, a small amount of finely divided magnetic powder of iron, nickel, ferrite or the like is added and dispersed upon preparing the toner as described above. Examples of developing processes which can be used in this case include contact development and jumping development.

The colored resin of the present invention comprises at least one kind of the dicyanoimidazole compound derivative represented by the formula [I] above in solution, the colored resin constituting resin being exemplified by thermoplastic resins such as styrene resin, acryl resin, styrene-acryl copolymer, polycarbonate, polyamide, polybutylene terephthalate, polyethylene, polypropylene and polyacetal, and thermosetting resins such as polyester, polyurethane and phenol resin. Particularly, when using the compound derivative of the present invention in combination with styrene resin, acryl resin, styrene-acryl copolymer or polycarbonate, a colored molded member with excellent transparency can be obtained.

The colored resin of the present invention can, for example, be produced by kneading in a molten state the compound derivative of the present invention, represented by the formula [I]. When using the colored resin for plastic molding, the compound derivative of the present invention is normally compounded at 0.1 to 1% by weight to the resin. Molding can be achieved by a known means such as injection molding.

The colored resin of the present invention can be used in combination with one or more other coloring agents as long as they do not interfere with the purpose or effect thereof.

The colored molded resin member of the present invention has been dyed with at least one kind of the dicyanoimidazole compound derivative represented by the formula [I], and examples of the resin constituting said colored molded resin member include the same as mentioned for the colored resin described above.

This colored molded resin member can be obtained by dyeing a molded resin with the compound derivative of the present invention by transfer, printing, sublimational deposition or other means.

A mode of the resin color filter of the present invention comprises at least one kind of the dicyanoimidazole compound derivative represented by the formula [I] in solution, and another mode of the resin color filter of the present invention has been dyed with at least one kind of the dicyanoimidazole compound derivative represented by the formula [I]. Examples of the resin constituting these color filters include the same as mentioned for the colored resin described above.

These color filters of resin can, for example, be produced by the method described in Japanese Patent Publication Open to Public Inspection No. 278569/1989 or another method in accordance therewith. Accordingly, examples of such methods include the method in which a dye is mixed with resin and solvent, followed by kneading to yield an ink, which is then used to dye a dyeable plastic base plate of polyester, polyamide, acryl resin or the like, the method in which a dye is kneaded in resin, followed by sheet molding, the method in which a synthetic resin film is dyed in a solvent such as ethylene glycol, and the method in which an ink composition is applied on paper etc. and dyeing a resin plate by transfer.

In the colored molded resin member and resin color filter of the present invention, other coloring agents can be used in combination, as long as they do not interfere with the purpose and effect thereof.

EXAMPLES

The present invention is hereinafter described in more detail by means of the following examples, but these are not to be construed as limitative on the present invention.

PREPARATION EXAMPLE 1

To 27.2 g of a dicyanoimidazole series monoazo compound [compound (A)] represented by the following formula:

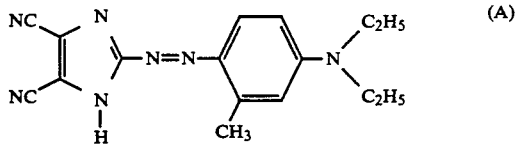
(A)

Figure 2:
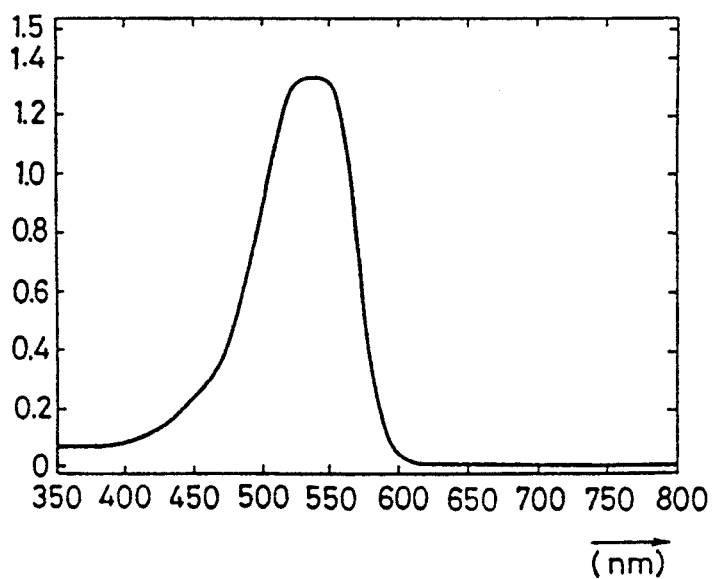
FIG. 2 is a visible-band absorption spectrum of the dicyanoimidazole compound derivative obtained in Preparation Example 2 (Example Compound 8).

200 ml of dimethylformamide and 13.6 g of potassium carbonate were added, and this mixture was heated to 60° C. with stirring. Then, 8.3 g of 1,3-dibromopropane was dropwise added to the mixture. After heating to 85° C., reaction was carried out at the constant temperature for 9 hours. The resulting reaction mixture was thereafter cooled to room temperature, and 600 ml of methanol was added. The separating crystal product was collected by filtration, washed with water and dried to yield 18.5 g of a crude product, which was recrystallized with methyl ethyl ketone to yield 14 g of the compound shown below (Example Compound 1 listed in Table 1 below). This compound had a melting point of 256° to 257° C. Its visible-band absorption spectrum is as shown in FIG. 1, with a maximum absorption λ max of 530 nm. In FIGS. 1 and 2, the abscissa indicates wavelength and the ordinate indicates absorbance. The absorbance of this Example Compound 1 and Examples Compounds 2 through 36 described below was determined in the presence of trichloromethane as the solvent using model 8451A Diode Array Spectrophotometer (trade name, produced by Hewlett Packard).

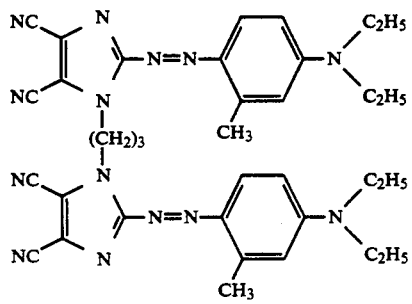

PREPARATION EXAMPLE 2

To 20.2 g of the compound represented by the following formula:

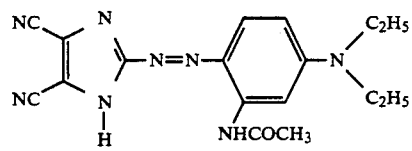

340 ml of acetone, 8.6 g of potassium carbonate and 6.9 g of α, α'-dibromo-p-xylene were added, followed by reflux with heating for 14 hours. The reaction mixture was cooled to room temperature, and 340 ml of water was added. The separating crystal product was collected by filtration, washed with water and dried to yield 19.4 g of a crude product containing a compound represented by the structural formula given below. The obtained crude product was dissolved in hot chloroform, and this solution was filtered with heating in the presence of activated charcoal. The resulting filtrate was recrystallized in methanol to yield 10.9 g of a purified product of the compound shown below (Example Compound 8 listed in Table 1 below). Its melting point was 279° to 280° C. The visible-band absorption spectrum is as shown in FIG. 2, with a maximum absorption λ max of 536 nm.

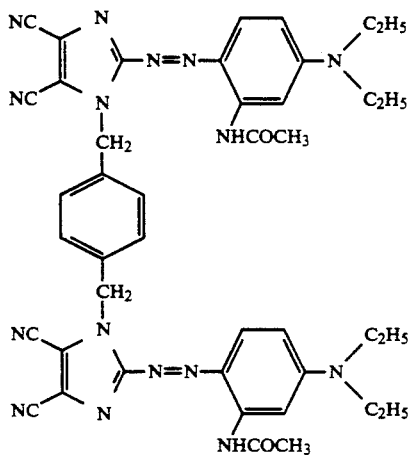

In accordance with the Preparation Examples 1 and 2 given above, other compounds specified in Table 1 below (Example Compounds 2 through 7 and 9 through 36) were obtained In Table 1, the figures in the column for λ max show the visible absorption maxima of respective Example Compounds.

TABLE 1

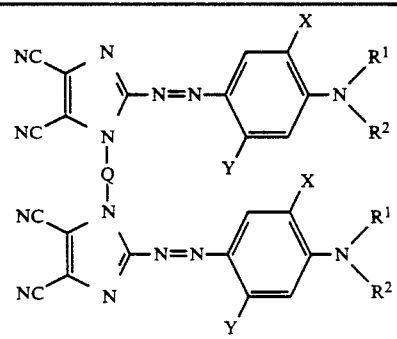

| Compound number | R¹ | R² | X | Y | —Q— | λmax (nm) |
|---|---|---|---|---|---|---|
| 1 | $C_2H_5$ | $C_2H_5$ | H | $CH_3$ | $-(CH_2)_3-$ | 530 |
| 2 | $C_2H_5$ | $C_2H_5$ | H | $CH_3$ | $-CH_2-C_6H_4-CH_2-$ | 522 |
| 3 | $C_2H_5$ | $C_2H_5$ | H | $CH_3$ | $-(CH_2)_6-$ | 514 |
| 4 | $C_2H_5$ | $C_2H_5$ | H | H | $-(CH_2)_4-$ | 520 |
| 5 | $C_4H_9$ | $C_4H_9$ | H | H | $-(CH_2)_4-$ | 526 |
| 6 | $C_4H_9$ | $C_4H_9$ | H | $CH_3$ | $-(CH_2)_6-$ | 520 |
| 7 | $C_2H_5$ | $C_2H_5$ | H | $NHCOCH_3$ | $-(CH_2)_3-$ | 556 |
| 8 | $C_2H_5$ | $C_2H_5$ | H | $NHCOCH_3$ | $-CH_2-C_6H_4-CH_2-$ | 536 |
| 9 | $C_2H_5$ | $C_2H_5$ | H | $NHCOCH_3$ | $-(CH_2)_6-$ | 530 |
| 10 | $C_2H_5$ | $C_2H_5$ | H | $NHCOCH_3$ | $-CH_2-CH=CH-CH_2-$ | 550 |
| 11 | $C_2H_5$ | $C_2H_4Cl$ | $OCH_3$ | $NHCOCH_3$ | $-(CH_2)_3-$ | 538 |
| 12 | $C_2H_5$ | $C_2H_4CN$ | H | $NHCOC_2H_5$ | $-(CH_2)_3-$ | 528 |
| 13 | $C_2H_5$ | $C_2H_5$ | H | $NHCOC_3H_7$ | $-(CH_2)_3-$ | 558 |
| 14 | $C_2H_5$ | $C_2H_5$ | H | NHCHO | $-(CH_2)_3-$ | 546 |
| 15 | $C_2H_5$ | $C_2H_5$ | H | $NHCOOC_2H_5$ | $-(CH_2)_3-$ | 544 |
| 16 | $C_2H_5$ | $C_2H_5$ | H | $NHCOC_6H_{13}$ | $-(CH_2)_3-$ | 540 |
| 17 | $C_2H_5$ | $C_2H_5$ | H | $NHSO_2CH_3$ | $-(CH_2)_3-$ | 558 |
| 18 | $C_2H_5$ | $C_2H_5$ | H | $NHSO_2C_2H_5$ | $-(CH_2)_3-$ | 560 |
| 19 | $-CH_2-C_6H_5$ | $C_2H_5$ | H | $CH_3$ | $-(CH_2)_3-$ | 536 |
| 20 | $C_2H_5$ | $C_2H_5$ | Cl | H | $-(CH_2)_3-$ | 524 |
| 21 | $CH_3$ | $CH_3$ | H | $NHCOCH_3$ | $-(CH_2)_3-$ | 538 |
| 22 | $C_2H_5$ | $C_2H_5$ | H | $NHCOC(CH_3)_3$ | $-(CH_2)_3-$ | 542 |
| 23 | $C_2H_5$ | $C_2H_4OH$ | H | $NHCOCH_3$ | $-(CH_2)_3-$ | 550 |
| 24 | $C_2H_5$ | $C_2H_4OCH_3$ | H | $NHCOCH_3$ | $-(CH_2)_3-$ | 544 |
| 25 | $C_2H_4OCH_3$ | $C_2H_4OCH_3$ | H | $NHCOCH_3$ | $-(CH_2)_3-$ | 536 |
| 26 | $C_2H_5$ | $C_2H_4OC_4H_9$ | H | $NHCOCH_3$ | $-(CH_2)_3-$ | 548 |

TABLE 1-continued

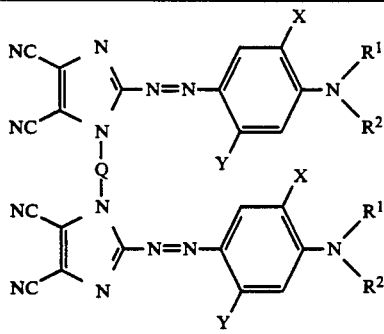

| Compound number | R¹ | R² | X | Y | —Q— | λmax (nm) |
|---|---|---|---|---|---|---|
| 27 | $C_2H_5$ | $C_2H_4$—⟨O⟩ | H | $NHCOCH_3$ | $-(CH_2)_3-$ | 556 |
| 28 | $C_4H_9$ | $C_2H_4$—⟨O⟩ | H | $NHCOCH_3$ | $-(CH_2)_3-$ | 558 |
| 29 | $C_5H_{11}$ | $C_5H_{11}$ | H | $NHCOCH_3$ | $-(CH_2)_3-$ | 560 |
| 30 | $C_6H_{13}$ | $C_6H_{13}$ | H | $NHCOCH_3$ | $-(CH_2)_3-$ | 560 |
| 31 | $C_2H_5$ | $C_2H_5$ | $OCH_3$ | $CH_3$ | $-(CH_2)_3-$ | 542 |
| 32 | $C_2H_5$ | $C_2H_5$ | Cl | $NHCOCH_3$ | $-(CH_2)_3-$ | 544 |
| 33 | $C_2H_5$ | $C_2H_5$ | $OC_2H_5$ | $NHCOCH_3$ | $-(CH_2)_6-$ | 548 |
| 34 | $C_2H_5$ | $CH_2-CHC_4H_9$ <br> $\|$ <br> $C_2H_5$ | H | $NHCOCH_3$ | $-(CH_2)_3-$ | 558 |
| 35 | $C_2H_5$ | $C_2H_5$ | H | $CH_3$ | $-CH_2-CH=CH-$ | 534 |
| 36 | $C_2H_5$ | $C_2H_5$ | H | $NHCOCH_3$ | $-CH=CH-$ | 560 |

The magenta toner for color electrophotography of the present invention and the actual imaging performance of developers incorporating said toner will be explained by means of Examples 1 through 5 below.

EXAMPLE 1

Styrene-acryl copolymer [HIMER TB-100 (trade name), produced by Sanyo Kasei Co., Ltd.] ... 100 parts Example Compound 1 ... 2 parts Charge control agent [Bontron E-84 (trade name), produced by Orient Chemical Industries Ltd.] ... 1 part The above ingredients were uniformly pre-mixed using a high-speed mixer, and the kneaded in a molten state using an extruder, cooled, and roughly milled with a vibration mill. The obtained coarse product was pulverized using an air jet mill equipped with a classifier to obtain fine powder of 5 to 20 μm in particle size. To this powder 1% by weight of colloidal silica was added to yield a toner.

Five parts of the obtained toner was admixed with 95 parts of resin-coated iron powder carrier [F813-150 (trade name), produced by Nippon Teppun Co., Ltd.] to yield a developer.

This developer was found to be $-20.1$ μC/g in the amount of initial blowoff charges. The amounts of initial blowoff charges of this developer under low-temperature low-humidity conditions (5° C., 30% relative humidity) and high-temperature high-humidity conditions (35° C., 90% relative humidity) were $-20.3$ μC/g and $-20.5$ μC/g, respectively, indicating very high stability.

When this developer was used for a commercial copying machine (selenium drum type) to form toner images, fog-free very distinct magenta color images were obtained. Even long term repeated use permitted the obtainment of stable copies free of quality degradation. The obtained copies showed a good color fastness to light of grade 7.

Color fastness to light was assessed by applying the sample to a fade meter (carbon arc type) for 40 hours and then comparing with the control kept in a normal state using a blue scale (Japanese Industrial Standard JIS L0841). The same applies in Examples below.

EXAMPLE 2

Polyester [HP-301. produced by The Nippon Gohsei Kagaku Kogyo K.K.] ... 100 parts Example Compound 2 ... 2 parts Charge control agent [Bontron E-88 (trade name), produced by Orient Chemical Industries Ltd.] ... 1 part Lower polypropylene [Biscal 550-P (trade name), produced by Sanyo Kasei Co., Ltd.] ... 10 parts The above ingredients were treated in the same manner as in Example 1 to yield a toner. Three parts of the obtained toner was admixed with 97 parts of iron powder carrier [TEFV200/300 (trade name), produced by Nippon Teppun Co., Ltd.] to yield a developer. This developer was found to be $-22.7$ μC/g in the amount of initial blowoff charges.

When copies were taken in the same manner as in Example 1, this developer gave fog-free distinct magenta images with high thin-line reproducibility. Even long term repeated use permitted the obtainment of stable copies free of image quality degradation.

This developer was used on a sheet for OHP to form toner images. The sheet was used for OHP to obtain distinct magenta images on screen.

EXAMPLE 3

Styrene-acryl copolymer [HIMER TB-1000 (trade name), produced by Sanyo Kasei Co., Ltd.] . . . 100 parts Example Compound 8 . . . 3 parts Charge control agent [Bontron E-84 (trade name), produced by Orient Chemical Industries Ltd. . . . 1 part Lower polypropylene [Biscal 550-P (trade name), produced by Sanyo Kasei Co., Ltd.] . . . 10 parts The above ingredients were treated in the same manner as in Example 1 to yield a toner. Three parts of the obtained toner was admixed with 97 parts of iron powder carrier [TEFV200/300 (trade name), produced by Nippon Teppun Co., Ltd.] to yield a developer. This developer was found to be $-20.5$ $\mu$C/g in the amount of initial blowoff charges.

When the developer was used for a commercial color copying machine [produced by Canon Inc.] to take copies, fog-free very distinct magenta images were obtained. Even long term repeated use permitted the obtainment of stable copies free of image quality degradation. When this developer was used in combination with a cyan toner and a yellow toner, color images with very good color reproduction were obtained.

EXAMPLE 4

Styrene-acryl copolymer [HIMER TB-1000 (trade name), produced by Sanyo Kasei Co., Ltd.] . . . 100 parts Example Compound 10 . . . 2 parts Charge control agent [Bontron P-51 (trade name), produced by Orient Chemical Industries Ltd.] . . . 1 part Lower polypropylene resin [Biscal 550-P (trade name), produced by Sanyo Kasei Co., Ltd.] . . . 10 parts The above ingredients were treated in the same manner as in Example 1 to yield a toner. Three parts of the obtained toner was admixed with 97 parts of iron powder carrier [TEFV200/300 (trade name), produced by Nippon Teppun Co., Ltd.] to yield a developer. This developer was found to be $+22.2$ $\mu$C/g in the amount of initial blowoff charges.

When the developer was used for a commercial copying machine [Canon NP (trade name), produced by Canon Inc.] to take copies, fog-free very distinct magenta images were obtained. Even long term repeated use permitted the obtainment of stable copies free of image quality degradation.

EXAMPLE 5

Styrene-acryl copolymer [HIMER TB-1000 (trade name), produced by Sanyo Kasei Co.. Ltd.] . . . 100 parts Example Compound 33 . . . 3 parts Iron sesquioxide ($Fe_2O_3$) . . . 10 parts Charge control agent [Bontron P-51 (trade name), produced by Orient Chemical Industries Ltd.] . . . 1 part Lower polypropylene [Biscal 550-P (trade name), produced by Sanyo Kasei Co., Ltd.] . . . 10 parts The above ingredients were uniformly premixed using a ball mill to yield a premix, which was then kneaded in a molten state using a twin-screw extruder [PCM-30 (trade name), produced by Ikegai Seisakusho Co., Ltd.], cooled and thereafter roughly crushed, pulverized and classified to yield a single-component toner of 5 to 15 $\mu$m in particle size.

When this toner was used for a commercial copying machine [NP-201 (trade name), produced by Canon Inc.] to form toner images, fog-free magenta images were obtained with high quality.

COMPARATIVE EXAMPLE 1

A toner was prepared and used to form copied images in the same manner as in Example 1 except that the dicyanoimidazole compound derivative according to the present invention (Example Compound 1) was replaced with the compound (A) shown in Preparation Example 1. The initially obtained copied images had a distinct magenta color, but repeated copying for a long period resulted in uneven copying with color density degradation and staining. The obtained copies had a color fastness to light of grade 5, lower by 2 grades than in Example 1.

The colored resin of the present invention will be described in more detail by means of Examples 6 and 7 below.

EXAMPLE 6

500 g of polystyrene resin [Dialex (trade name), produced by Mitsubishi Monsanto Chemical Co.] and 0.25 g of Example Compound 1 as coloring agent were placed in a stainless steel tumbler and mixed thoroughly with stirring for 1 hour. This mixture was kneaded in a molten state at 200° C. using a vent-type extruder and pelletized by a standard method to yield colored pellets.

These pellets were then dried at 80° C. for 3 hours and subsequently subjected to an ordinary method of injection molding at a molding temperature of 200° C. to prepare a test plate. Example Compound 1 well endured the heat during kneading in a molten state and molding, giving a red molded plate with excellent transparency.

The color fastness to light of this molded plate was found to be of grade 7, and its bleeding resistance was of grade 5.

The bleeding resistance was determined by leaving the test plate at 120° C. for 24 hours while keeping the test plate under a load of 200 g/cm$^2$ between two uncolored molded plates of the same material as the test plate, and then evaluating the degree of staining onto the uncolored molded plates using a grey scale (Japanese Industrial Standard JIS L0805). The same applies in Examples below.

EXAMPLE 7

500 g of methacryl resin [Acrypet (trade name), produced by Mitsubishi Rayon Co., Ltd.] and 0.25 g of Example Compound 8 as coloring agent were placed in a stainless steel tumbler and mixed thoroughly with stirring for 1 hour. This mixture was kneaded in a molten state at 210° C. using a vent-type extruder and pelletized by a standard method to yield colored pellets. When these pellets were treated in the same manner as in Example 6, Example Compound 8 well endured heat during kneading in a molten state and molding, giving a red molded plate with excellent transparency. This molded plate was found to be good in color fastness to light at grade 7 and bleeding resistance at grade 5.

COMPARATIVE EXAMPLE 2

To compare color fastness to light and bleeding resistance, a molded plate was prepared in the same manner as in Example 6 except that Example Compound 1 used in Example 6 was replaced with 0.125 g of the compound (A) shown in Preparation Example 1.

This molded plate was found to be of grade 5 in color fastness to light and grade 3 or 4 in bleeding resistance, lower by 2 grades and 1 to 2 grades, respectively, in comparison with Example 6.

The resin color filter of the present invention will be hereafter described in more detail by means of Examples 8 and 9.

EXAMPLE 8

On a molded plate of methacrylate resin [Acrypet (trade name), produced by Mitsubishi Rayon Co., Ltd.], a sheet of transfer paper, prepared from 2 g of Example Compound 1, 10 g of Pyronal MD1200 [(trade name), produced by Toyobo Corporation] and 1 g of silica gel, was placed, followed by calendering at 200° C. to yield a red filter as a result of dyeing the molded plate.

This filter was found to be of grade 7 in color fastness to light and of grade 5 in bleeding resistance. Its spectral transmittance also was good.

EXAMPLE 9

5 g of polyester film and 2 g of Example Compound 11 were placed into 1000 g of ethylene glycol, and the polyester film was dyed at 120° C. for 90 minutes to yield a red filter. This filter was found to be of grade 6 to 7 in color fastness to light and of grade 5 in bleeding resistance. Its spectral transmittance also was good.

COMPARATIVE EXAMPLE 3

To compare color fastness to light and bleeding resistance, a red filter was prepared in the same manner as in Example 9 except that Example Compound 11 used in Example 9 was replaced with 1 g of a monoazo compound represented by the structural formula given below.

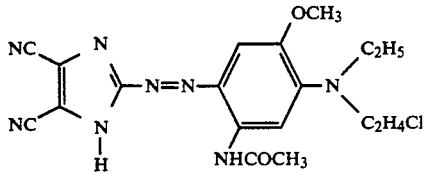

This red filter was found to be of grade 5 in color fastness to light and of grade 3 in bleeding resistance, lower by 1 to 2 grades and 2 grades, respectively, in comparison with Example 9.

What is claimed is:

1. Magenta toner for color electrophotography incorporating at least one kind of the dicyanoimidazole compound as coloring agent, said Dicyanoimidazole compound having the formula

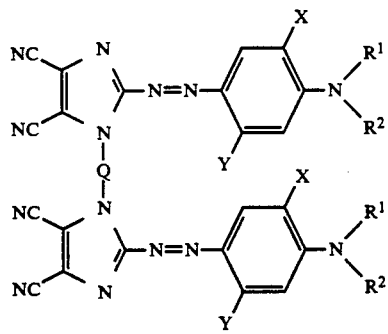

wherein $R^1$ and $R^2$ each independently is alkyl having 1-12 carbon atoms, alkoxyalkyl having 3-12 carbon atoms, hydroxy lower alkyl, $\beta$-cyanoethyl, $\beta$-chloroethyl, aralkyl or aryl, in which said aralkyl and aryl are unsubstituted or substituted with phenyl, halogen, lower alkyl and lower alkoxy; X is hydrogen, lower alkoxy, methyl or halogen; Y is hydrogen, methyl, methoxy, formylamino, alkylcarbonylamino having 1-8 carbon atoms in the alkyl moiety, alkylsulfonylamino having 1-8 carbon atoms in the alkyl moiety or alkoxycarbonylamino having 1-14 8 carbon atoms in the alkyl moiety; and —Q— is —$(CR_2)_n$— in which n is 1-12 and each R independently is hydrogen ar alkyl,

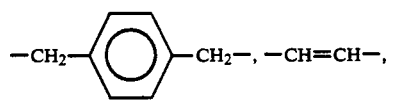

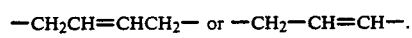

2. Magenta toner for color electrophotography comprising at least a binder resin, a coloring agent, and a charge control effective amount of a charge control agent, wherein at least one kind of dicyanoimidazole compound is contained as coloring agent and said binder resin and charge control agent are substantially colorless said Dicyanoimidazole compound having the formula

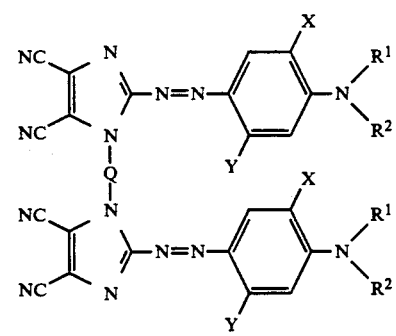

wherein $R^1$ and $R^2$ each independently is alkyl having 1-12 carbon atoms, alkoxyalkyl having 3-12 carbon atoms, hydroxy lower alkyl, $\beta$-cyanoethyl, $\beta$-chloroethyl, aralkyl or aryl, in which said aralkyl and aryl are unsubstituted or substituted with phenyl, halogen, lower alkyl and lower alkoxy; X is hydrogen, lower alkoxy, methyl or halogen; Y is hydrogen, methyl, methoxy, formylamino, alkylcarbonylamino having 1-8 carbon atoms in the alkyl moiety, alkylsulfonylamino having 1-8 carbon atoms in the alkyl moiety or alkoxycarbonylamino having 1-8 carbon atoms in the alkyl moiety; and —Q— is —$(CR_2)_n$— in which n is 1-12 and each R independently is hydrogen or alkyl,

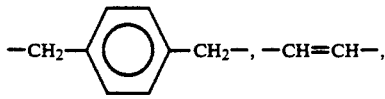

—$CH_2CH=CHCH_2$— or —$CH_2$—CH=CH—.

3. Magenta toner for color electrophotography of claim 2 wherein said charge control agent is metal complex of aromatic o-oxycarboxylic acid or metal complex of aromatic dicarboxylic acid.

4. Magenta toner for color electrophotography of claim 2 wherein said charge control agent is one or more kinds of charge control agent which impart negative charge selected from the group consisting of chromium complex of alkyl-substituted salicylic acid, zinc complex of alkyl-substituted salicylic acid, aluminum complex of alkyl-substituted salicylic acid, chromium complex of oxynaphthoic acid, zinc complex of oxynaphthoic acid, aluminum complex of oxynaphthoic acid, chromium complex of aromatic dicarboxylic acid and zinc complex of aromatic dicarboxylic acid.

5. Magenta toner for color electrophotography of claim 2 wherein said charge control agent is quaternary ammonium compound of polyamine resin.

6. Magenta toner for color electrophotography of claim 2 wherein said binder resin is one or more kinds of resin selected from the group consisting of polystyrene resin, acryl and acrylic resins, styrene-(meth)acrylate copolymer, polyester resin, epoxy resin, polyamide resin, polyvinylal resin, polyethylene resin, polypropylene resin and polyolefin.

7. Magenta toner for color electrophotography of claim 2 incorporating at least one kind of the dicyanoimidazole compound derivative of claim 1 as coloring agent and a charge control agent, in a ratio of 0.5 to 10 parts by weight and 0.1 to 10 parts by weight, respectively, per 100 parts by weight of binder resin.

8. Colored resin comprising at least one kind of dicyanoimidazole compound derivative in solution, said Dicyanoimidazole compound having the formula

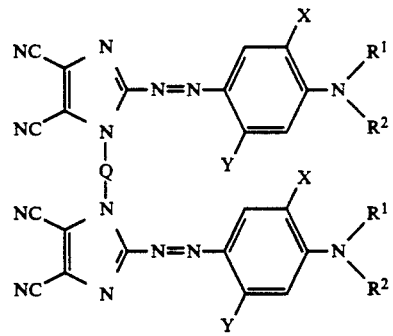

wherein $R^1$ and $R^2$ each independently is alkyl having 1-12 carbon atoms, alkoxyalkyl having 3-12 carbon atoms, hydroxy lower alkyl, β-cyanoethyl, β-chloroethyl, aralkyl or aryl, in which said aralkyl and aryl are unsubstituted or substituted with phenyl, halogen, lower alkyl and lower alkoxy; X is hydrogen, lower alkoxy, methyl or halogen; Y is hydrogen, methyl, methoxy, formylamino, alkylcarbonylamino having 1-8 carbon atoms in the alkyl moiety, alkylsulfonylamino having 1-8 carbon atoms in the alkyl moiety or alkoxycarbonylamino having 1-8 carbon atoms in the alkyl moiety; and —Q— is —$(CR_2)_n$— in which n is 1-12 and each R independently is hydrogen or alkyl,

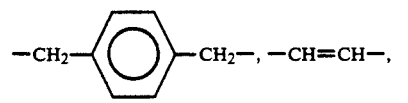

—$CH_2CH=CHCH_2$— or —$CH_2$—CH=CH—.

9. Colored resin of claim 8 wherein said resin is a thermoplastic resin selected; from the group consisting of styrene resin, acryl resin, styrene-acryl copolymer, polycarbonate, polyamide, polybutylene terephthalate, polyethylene, polypropylene and polyacetal.

10. Colored resin of claim 8 wherein said resin is a thermosetting resin selected from the group consisting of polyester, polyurethane and phenol resin.

11. Colored resin of claim 8 incorporating at least one kind of the dicyanoimidazole compound in a ratio of 0.1 to 10% by weight to the resin.

12. Colored molded resin member dyed with at least one kind of the dicyanoimidazole compound derivative of claim 8.

13. Colored molded resin member of claim 12 wherein the resin which constitutes the molded resin member is a resin selected from the group consisting of styrene resin, acryl resin, styrene-acryl copolymer, polycarbonate, polyamide, polybutylene terephthalate, polyethylene, polypropylene, polyacetal, polyester, polyurethane and phenol resin.

14. Resin color filter dyed with at least one kind of the dicyanoimidazole compound derivative of claim 8 in solution.

15. Resin color filter dyed with at least one kind of the dicyanoimidazole compound derivative of claim 8.

16. Resin color filter of claim 14 wherein said resin is a resin selected from the group consisting of styrene resin, acryl resin, styrene-acryl copolymer, polycarbonate, polyamide, polybutylene terephthalate, polyethylene, polypropylene, polyacetal,1 polyester, polyurethane and phenol resin.

17. Resin color filter of claim 15 wherein said resin is a resin selected from the group consisting of styrene resin, acryl resin, styrene-acryl copolymer, polycarbonate, polyamide, polybutylene terephthalate, polyethylene, polypropylene, polyacetal, polyester, polyurethane and phenol resin.

* * * * *